US009828847B2

(12) United States Patent
Vavik (10) Patent No.: US 9,828,847 B2
(45) Date of Patent: Nov. 28, 2017

(54) METHOD FOR PREDICTING HYDRATE FORMATION (71) Applicant: MHWIRTH AS, Kristiansand (NO)

(72) Inventor: Dag Vavik, Trondheim (NO)

(73) Assignee: MHWIRTH AS, Kristiansand (NO)

( * ) Notice: Subject to any disclaimer, the term of this patent is extended or adjusted under 35 U.S.C. 154(b) by 0 days.

(21) Appl. No.: 15/317,119

(22) PCT Filed: May 21, 2015

(86) PCT No.: PCT/NO2015/050086
§ 371 (c)(1),
(2) Date: Dec. 8, 2016

(87) PCT Pub. No.: WO2015/190933
PCT Pub. Date: Dec. 17, 2015

(65) Prior Publication Data
US 2017/0138170 A1   May 18, 2017

(30) Foreign Application Priority Data
Jun. 10, 2014   (NO) .................................. 20140719

(51) Int. Cl.
E21B 47/00   (2012.01)
E21B 47/06   (2012.01)
(Continued)

(52) U.S. Cl.
CPC ........ *E21B 47/0001* (2013.01); *E21B 21/001* (2013.01); *E21B 47/06* (2013.01);
(Continued)

(58) Field of Classification Search
CPC .... E21B 47/0001; E21B 47/06; E21B 47/065; E21B 21/001; G01V 99/005
See application file for complete search history.

(56) References Cited

U.S. PATENT DOCUMENTS 4,575,261 A * 3/1986 Berger .................. E21B 47/065
                                                340/870.17
6,427,785 B2 * 8/2002 Ward ...................... E21B 21/08
                                                166/250.07
(Continued)

FOREIGN PATENT DOCUMENTS

CA        2860532 C   *  7/2016  ............ C10L 1/1658
CN   WO 2016078165 A1  *  5/2016  ............ E21B 47/00
(Continued)

OTHER PUBLICATIONS

S. Hodges et al.: "Application of Optical Sensors in Deepwater Environments", OTC, pp. 1-10 (1999).
(Continued)

Primary Examiner — James G Sayre
(74) Attorney, Agent, or Firm — Norman B. Thot (57) ABSTRACT A method for predicting a formation of hydrates in a wellbore/riser annulus during a drilling operation. The method includes logging actual mud properties. Actual sets of pressure and temperature data at given locations/intervals in the wellbore or in the drilling riser annulus are continuously measured and/or calculated. A theoretical temperature profile for the formation of hydrates dependent on mud properties and pressure as a function of a true vertical depth in a well is determined. The theoretical temperature profile for the formation of hydrates in a control system is stored. The measured and/or calculated actual sets of pressure and temperature data is compared with the theoretical temperature profile for the formation of hydrates. A signal is issued if the measured and/or calculated actual sets of pressure and temperature data falls below or is lower than a predefined safety margin for the theoretical temperature profile for the formation of hydrates.

12 Claims, 7 Drawing Sheets (51) Int. Cl.
*E21B 21/00* (2006.01)
*G01V 99/00* (2009.01)
*G01V 9/00* (2006.01)
*G01V 11/00* (2006.01)

(52) U.S. Cl.
CPC .......... *E21B 47/065* (2013.01); *G01V 9/005* (2013.01); *G01V 11/002* (2013.01); *G01V 99/005* (2013.01)

(56) References Cited

U.S. PATENT DOCUMENTS

| | | | | |
|---|---|---|---|---|
| 6,789,937 | B2* | 9/2004 | Haddad | E21B 47/065 374/102 |
| 6,828,547 | B2* | 12/2004 | Tubel | E21B 47/00 166/250.01 |
| 6,957,577 | B1* | 10/2005 | Firmin | E21B 47/06 73/152.51 |
| 7,397,976 | B2* | 7/2008 | Mendez | E21B 47/06 385/12 |
| 7,941,285 | B2* | 5/2011 | Devries | E21B 37/06 702/50 |
| 8,881,843 | B2* | 11/2014 | Todd | E21B 17/01 166/267 |
| 9,347,310 | B2* | 5/2016 | Unalmis | G01F 1/74 |
| 9,605,502 | B2* | 3/2017 | Leuchtenberg | E21B 33/038 |
| 2001/0020675 | A1* | 9/2001 | Tubel | E21B 47/00 250/227.11 |
| 2004/0256100 | A1* | 12/2004 | Tubel | E21B 47/00 166/250.01 |
| 2005/0139138 | A1* | 6/2005 | DeVries | E21B 37/06 114/256 |
| 2005/0283276 | A1* | 12/2005 | Prescott | E21B 47/06 700/282 |
| 2009/0236144 | A1* | 9/2009 | Todd | E21B 17/01 175/5 |
| 2009/0240446 | A1* | 9/2009 | DeVries | E21B 37/06 702/50 |
| 2011/0205079 | A1* | 8/2011 | DeVries | E21B 37/06 340/853.2 |
| 2013/0090855 | A1* | 4/2013 | Rasmus | E21B 47/06 702/9 |
| 2013/0116962 | A1* | 5/2013 | Vestbostad | E21B 43/01 702/130 |
| 2014/0076547 | A1* | 3/2014 | Unalmis | G01F 1/74 166/250.01 |
| 2015/0068758 | A1* | 3/2015 | Leuchtenberg | E21B 21/08 166/336 |
| 2015/0114628 | A1* | 4/2015 | Chen | G01V 9/005 166/250.01 |
| 2016/0376886 | A1* | 12/2016 | Rasmus | E21B 47/06 702/9 |

FOREIGN PATENT DOCUMENTS

| | | | |
|---|---|---|---|
| WO | WO 2005/038409 A2 | 4/2005 | |
| WO | WO 2008051978 A1 * | 5/2008 | ............. E21B 21/08 |

OTHER PUBLICATIONS

B. Herzhaft et al.: "Gas Hydrate Formation in Drilling Mud Characterized With DSC Technique", SPE Annual Technical Conference and Exhibition, pp. 1-10 (2001).

D. T. Lai et al.: "Investigation of Natural Gas Hydrates in Various Drilling Fluids", SPE/IADC Drilling Conference, pp. 181-194 (1989).

* cited by examiner

METHOD FOR PREDICTING HYDRATE FORMATION

CROSS REFERENCE TO PRIOR APPLICATIONS

This application is a U.S. National Phase application under 35 U.S.C. §371 of International Application No. PCT/NO2015/050086, filed on May 21, 2015 and which claims benefit to Norwegian Patent Application No. 20140719, filed on Jun. 10, 2014. The International Application was published in English on Dec. 17, 2015 as WO 2015/190933A1 under PCT Article 21(2).

FIELD

The present invention relates to a method for predicting hydrate formation risk while drilling.

BACKGROUND

The offshore drilling industry is going to deeper water, introducing new challenges. Deep water with low water temperature in combination with high pressure increases the risk of hydrates. Some fields like the pre-salt reservoir outside Brazil and the Gulf of Mexico have got challenging wells with very little drilling margin, (difference with pore pressure and fracture pressure). Drilling in fractured carbonate is also a challenge for the industry. These types of wells often experience lost circulation cases and sometimes in combination with gas kicks. When lost circulation is experienced, lost circulation material (LCM) or other sacrificial fluids can be pumped down the well in large quantities which will cool down the well, increasing the hydrate risk. Use of pressurized mud cap drilling or dual mud cap drilling increase also risk of hydrates since often large amount of water is used to pump down the well. The introduction of managed pressure drilling (MPD) increase also the risk of hydrates in riser, since the riser will see a higher pressure compared with conventional drilling.

Hydrates may plug subsea BOP (typically below annular preventer) and subsea kill and choke lines. Several case histories and papers about plugged kill and choke lines and other hydrate issues have been published. With introduction of special dual gradient managed pressure drilling MPD system with annular preventer installed subsea in the drilling riser and conventional MPD with riser drilling device (RDD), the risk of plugging outlets from the drilling riser also increases.

SUMMARY

An aspect of the present invention is to overcome the shortcoming of today's well monitoring systems, with respect to predicting hydrate formation risk while drilling, tripping and after periods with low or no circulation. Another aspect of the present invention is to provide guidelines for correct remedial action(s) to be taken to avoid incidents with hydrate plugs.

In an embodiment, the present invention provides a method for predicting a formation of hydrates in a wellbore or in a riser annulus if a gas is present which includes logging actual mud properties, continuously measuring and/or calculating actual sets of pressure data and temperature data at given locations/intervals in the wellbore or in the riser annulus, determining a theoretical temperature profile for the formation of hydrates dependent on mud properties and pressure as a function of a true vertical depth in a well, storing the theoretical temperature profile for the formation of hydrates in a control system, comparing the measured and/or calculated actual sets of pressure data and temperature data with the theoretical temperature profile for the formation of hydrates, and issuing a signal from a control system if the measured and/or calculated actual sets of pressure data and temperature data falls below or is lower than a predefined safety margin for the theoretical temperature profile for the formation of hydrates.

BRIEF DESCRIPTION OF THE DRAWINGS

The present invention is described in greater detail below on the basis of embodiments and of the drawings in which.

DETAILED DESCRIPTION

The present invention relates to a method for predicting formation of hydrates in a wellbore or riser annulus, given that gas is present, where the method comprises the following steps:

logging of actual mud properties, continuously measuring and/or calculating actual sets of pressure data and temperature data at given locations/intervals in the wellbore or riser annulus, determining a theoretical temperature profile for formation of hydrates $T_{Hyd}$, dependent on mud properties and pressure as a function of true vertical depth (TVD) in the well, and storing said theoretical temperature profile for formation of hydrates $T_{Hyd}$ in a control system, utilizing said measured and/or calculated actual set of temperature data and comparing with the theoretical temperature profile for formation of hydrates $T_{Hyd}$, a signal being given from the control system if said measured and/or calculated actual set of temperature data is getting below or lower than a predefined safety margin for the theoretical temperature profile for formation of hydrates $T_{Hyd}$.

In an aspect, the method according to the present invention may further comprise the use of at least a first pressure transmitter ($P_{BH}$) and at least a first temperature transmitter ($T_{BH}$) arranged in a first position in a well, and at least a second pressure transmitter ($P_{BH}$), in order to measure and/or calculate the actual set of pressure data and temperature data.

The at least first temperature transmitter ($T_{BH}$) and the at least first pressure transmitter ($P_{BH}$) may be arranged in an open hole section of the well.

In an aspect of the method according to the present invention, the method may use a plurality of pressure transmitters ($P_1, P_2, \ldots, P_n$) in fixed vertical distance in the well, wherein the method further comprises measuring an/or calculating the temperature at different locations in the well.

The method according to the present invention may further comprise the step of:
  always displacing the riser if temperature in riser is below the theoretical temperature profile for formation of hydrates $T_{Hyd}$,
  pumping fresh mud down at least one booster line and circulating out gas cut mud,
  monitoring possible rapid gas expansion as hydrates melt at low pressure
  be prepared to divert overboard to avoid riser blow-out on drill floor.

The method according to the present invention may further comprise, in case a wellbore influx has inadvertently passed a subsea blowout preventer (BOP), pumping mud down at least one booster line and circulating out gas cut mud, and monitoring possible rapid gas expansion and be prepared to divert overboard to avoid "riser blow-out" on drill floor.

The method according to the present invention may further comprise the steps of filling at least one kill line with hydrate inhibitor fluid, injecting said hydrate inhibitor fluid present in the at least one kill line in the blow out preventer (BOP), and, simultaneously pumping fresh mud down the drill string to circulate out the wellbore fluids and inhibitor up at least one choke line and divert to a mud gas separator.

The method according to the present invention may further comprise the steps of identifying a stuck pipe situation as a possible result of hydrate formation, by observing increased drag trend or torque oscillation during connections and/or abnormal pressure increase or pressure oscillation during circulation, and confirming that all of the following conditions are fulfilled: then
  drilling in a permeable formation, which permeable formation is identified to have the ability to act as a reservoir rock as well as having a pressure close to or higher than a bottom hole pressure or measured pressure at a pressure transmitter ($P_1$-$P_n$) in the well,
  observing that the temperature in the wellbore is below the hydrate formation temperature $T_{Hyd}$, and
  observing circulation restriction or pressure peak.

In an aspect of the method according to the present invention, in case of a stuck pipe situation caused by hydrate formation, the method may further comprise the steps of:
  injecting hydrate inhibitor fluid close to a wellhead,
  stop circulation allowing the temperature in the formation to increase the temperature of the fluids in the well thereby melting or dissociating the hydrates into water and dense gas,
  perform flow check to verify hydrate dissociation process has started,
  shut-in the well if well starts to flow and monitor shut-in pressure increase to determine size of hydrate plug/kick.

The present invention also relates to a control system for predicting formation of hydrates in a well as a function of true vertical depth (TVD), wherein the control system comprises means for measuring or calculating actual sets of pressure data and temperature data based on received logged and continuously measured data for actual mud properties and pressure and temperature in the well, and means for comparing the actual set of temperature data with a theoretical temperature profile for formation of hydrates $T_{Hyd}$, and a signal generator generating a signal to an operator if said actual set of temperature data is getting below or lower than a predetermined safety margin for the theoretical temperature profile for formation of hydrates $T_{Hyd}$.

Figure 1:
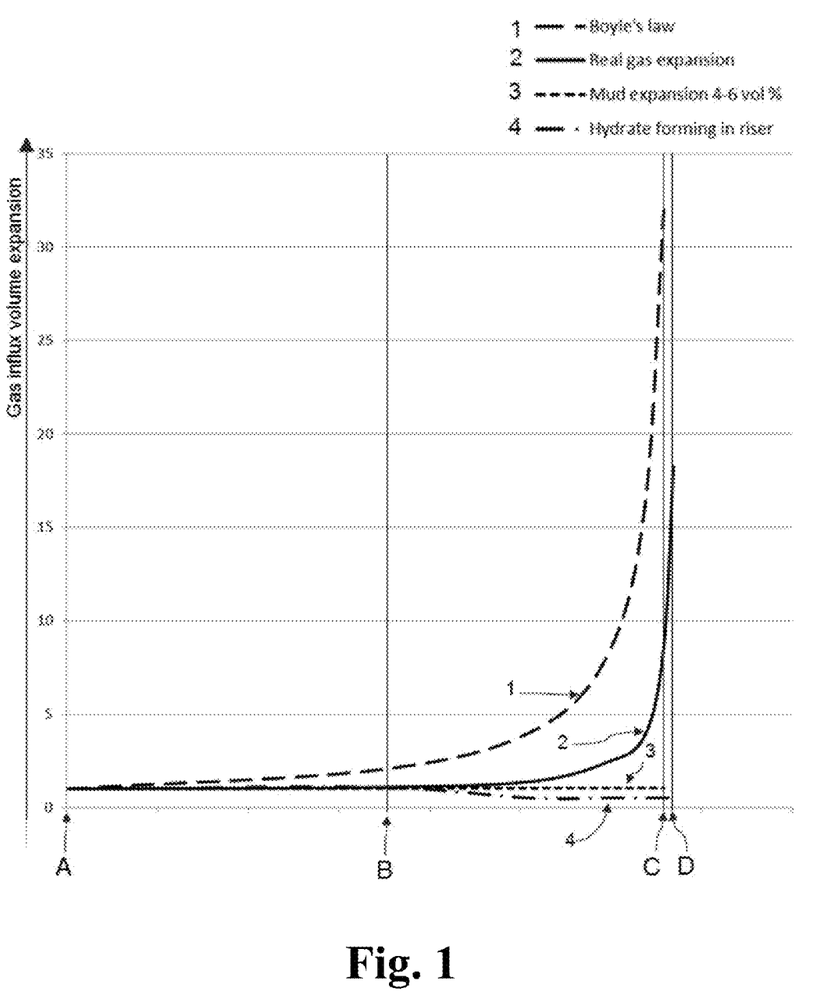
FIG. 1 is a schematic showing the gas influx volume expansion as it travels up the wellbore and riser.

FIG. 1 shows how a specific volume of gas influx will expand as it travels up the wellbore and riser towards a floating drilling unit, e.g., a rig. The X-axis indicates travel distance, or more correctly pressure reduction, as the influx travels from bottom of the wellbore where influx may enter the wellbore at a position A, to the floating drilling unit at a position D. The pressure used in the simulated gas influx at position A is 1000 bara. Position B indicates the seabed and the subsea BOP located at 3000 meter water depth, where the pressure is reduced to 500 bara due to reduction of static column of mud with specific gravity SG 1.5 ($\rho$=1500 kg/m3, density). Position C is in the drilling riser annulus 100 meters below sea level where the pressure is reduced to 31 bara. Position D is onboard the drilling unit upstream the managed pressure drilling (MPD) choke, where the pressure is approximately 16 bara. Boyle's law (line 1) says that when the pressure of a gas is reduced by 50% the volume will expand by 100%. In other words, if the pressure is reduced from 1000 bara (position A) to 500 bara (position B), the volume should increase from 1.0 m$^3$ to 2.0 m$^3$, according to Boyle's law (line 1). However, under these high pressures currently experienced in deep water, the natural gas influx will be in dense phase and have a density behavior similar to a liquid. The real gas expansion (line 2) below the subsea BOP located at seabed at position B is insignificantly higher than the mud expansion (line 3). For this reason early kick detection based on changes in density or volume as the undetected kick travels up the wellbore will not work. In deep water it is also another challenge that the annulus fluid in the wellhead, subsea blow out preventer BOP and lower part of the riser has a temperature that often are well below the temperature where hydrates form ($T_{Hyd}$). When the gas influx then reach the wellhead (position B) it will be cooled by the cold surrounding seawater and hydrates may form in the riser (line 4). For kick detection, based on gas expansion (line 2), this will be catastrophic because when hydrates are forming in the riser (line 4), the total volume will decrease rather than increase. When the hydrates is transported to upper part of the riser C, they may dissociate (melt) into water and gas as the pressure in the riser get lower, causing a rapid gas expansion. However, the dissociation time (how rapid the hydrates melt) is very uncertain, and depends on many factors. The most important factor is how much applied surface back pressure ($P_{ASBP}$) that the riser annulus will see upstream the managed pressure drilling MPD choke (position D). In the worst case scenario the hydrate dissociation time will be so long that there is a risk that the outlets from the drilling and top of the riser plugs up with hydrates before the hydrates dissociate when the riser is equipped with managed pressure drilling MPD or riser gas handling (RGH) choke (MPD/RGH choke) capable of applying back pressure to the riser annulus. For conventional drilling with atmospheric riser and conventional flow line, a rapid gas expansion associated with hydrates dissociate in the upper part of the riser, with a possible gas and mud "blow-out" on drill floor or through the diverter system most likely to be the scenario. This shows how important it is to have a method for predicting hydrate formation risk while drilling.

Figure 2:
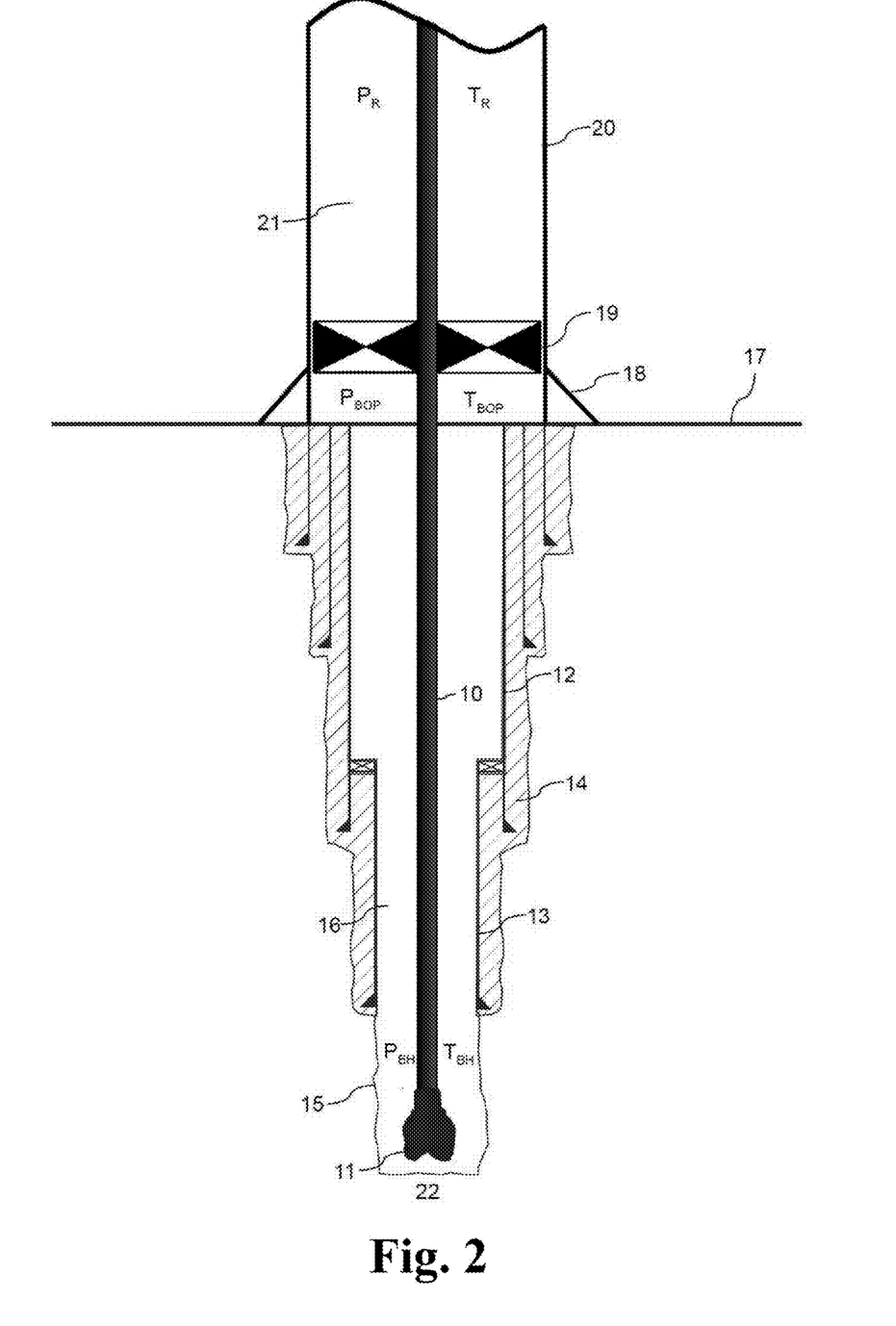
FIG. 2 is a simplified schematic of a subterranean well and drilling riser showing multiple sensors for transmitting downhole information such as pressure and temperature to the rig.

FIG. 2 shows a simplified schematic of a subterranean well and lower part of a drilling riser 20. The well is cased with casing 12 in the upper part and a liner 13 in the middle part, which are cemented 14 to the earth formation 22. A lower part of the well is an open-hole section 15. A drill string 10 extends from the top of the riser 20 to the bottom of the well having a drill bit 11 in its lowermost end for drilling into the earth formation 22. Drilling fluids flow on the inside of the drill string 10 down to the drill bit 11 and flows back up towards the surface in the annulus 16 formed between the drill string 10 and the earth formation 22, liner 13 or the casing 12. A larger annulus 21 is formed between the drill string 10 and the marine drilling riser 20. A first pressure transmitter $P_{BH}$ is arranged in the open hole section 15. At least a second pressure transmitter $P_{BOP}$ is arranged in the blow out preventer BOP stack 19 or the wellhead 18 above the seabed 17. At least a first temperature transmitter $T_{BH}$ is arranged close to the pressure transmitters $P_{BH}$. A plurality of temperature transmitters $T_1$, $T_2$, ... $T_n$ can be arranged in the wellbore and drilling riser to obtain a better temperature profile of the annulus fluid temperature. As should be understood, a plurality of pressure transmitters $P_1$, $P_2$ ... $P_n$ may also be arranged in the wellbore and drilling riser. Above the seabed 17 a wellhead 18 and a subsea BOP 19 is connected to the marine drilling riser 20. At least an additional temperature transmitter $T_R$ and pressure transmitter $P_R$ are recommended to be installed in the lower or middle part of the marine drilling riser, where the annulus temperature is expected to be lowest during circulation. Note that in the event of pressure and temperature transmitters are not present, an annulus pressure and temperature profile can be calculated using advanced algorithms and surface measurements, however especially the temperature profile will be very transient after periods with low or no circulation and hence difficult to predict accurately for any given time during these transient phases.

Figure 3:
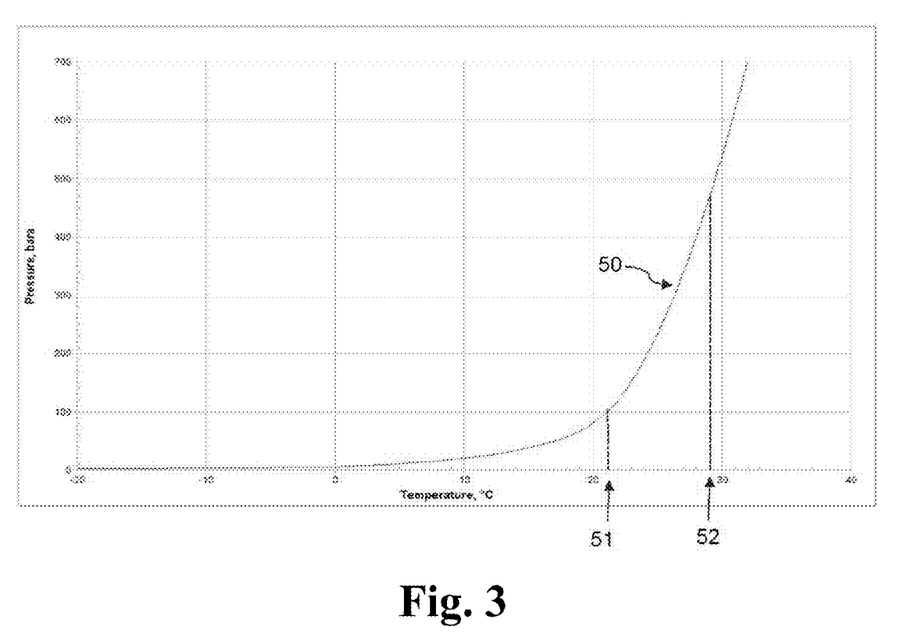
FIG. 3 discloses schematically how hydrate formation temperature between natural gas and water increases with increased pressure.

FIG. 3 discloses schematically how hydrate formation temperature between natural gas and water increases with increased pressure 50. At atmospheric pressure the hydrate formation temperature ($T_{Hyd}$) will be less than $-20°$ C., while at 100 bara $T_{Hyd}$ will be $+21°$ C., 51. At the seabed (compare B in FIG. 1) the ambient seawater temperature will be 3 to 4° C., and the pressure inside the riser can be as high as 500 bara, corresponding to a hydrate formation temperature $T_{Hyd}$ of up to $+29°$ C., 52. This shows how important it is to make sure that the kill and choke line, which main purpose is to circulate out gas influx in case of a well control event, are prepared with hydrate inhibitor to prevent them blocking up when gas is circulated out. The amount of salt used in the mud, and if oil based mud (OBM) are used, the hydrate formation temperature $T_{Hyd}$ will be slightly lower. However, it should be noted that the use of OBM will not eliminate the hydrate risk, because even oil based mud OBM contains water to a certain extent, typically 20%. When calculating the hydrate formation temperature $T_{Hyd}$ it is therefore important that details about the mud properties are taken into consideration.

Figure 4:
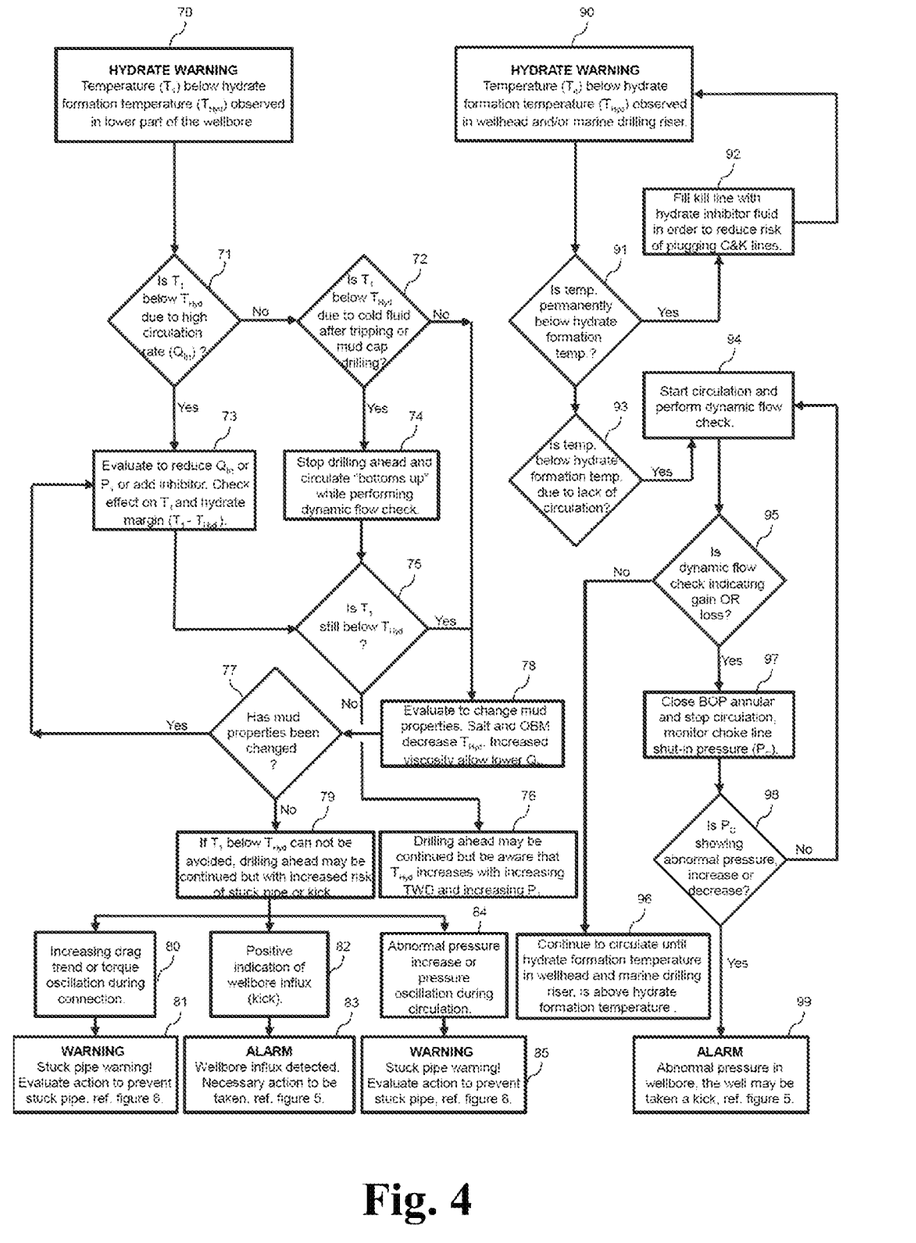
FIG. 4 discloses schematically a method for determining the correct remedial action to be taken based on hydrate warning.
Figure 5:
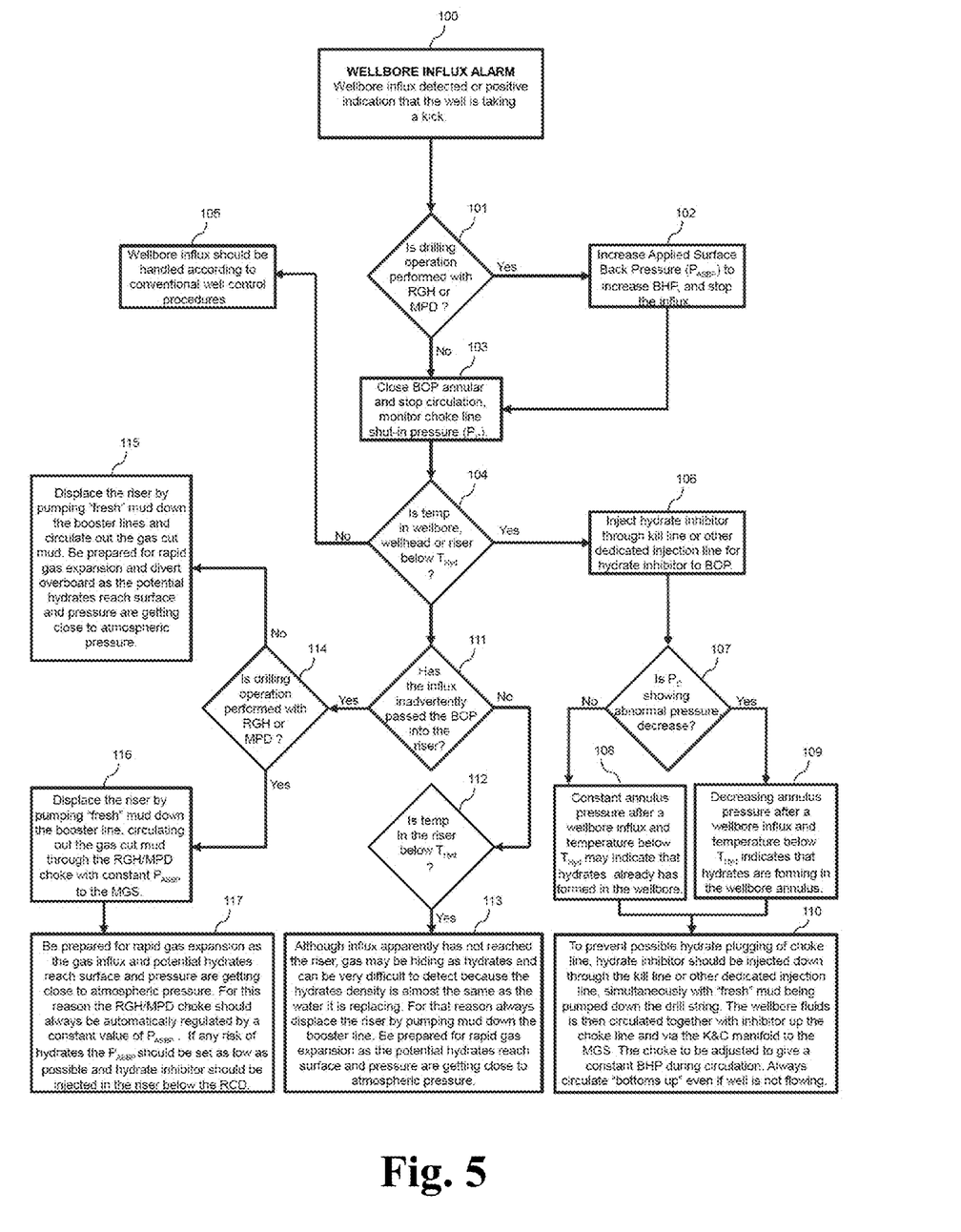
FIG. 5 discloses schematically a method for determining the correct remedial action to be taken based on wellbore influx alarm.
Figure 6:
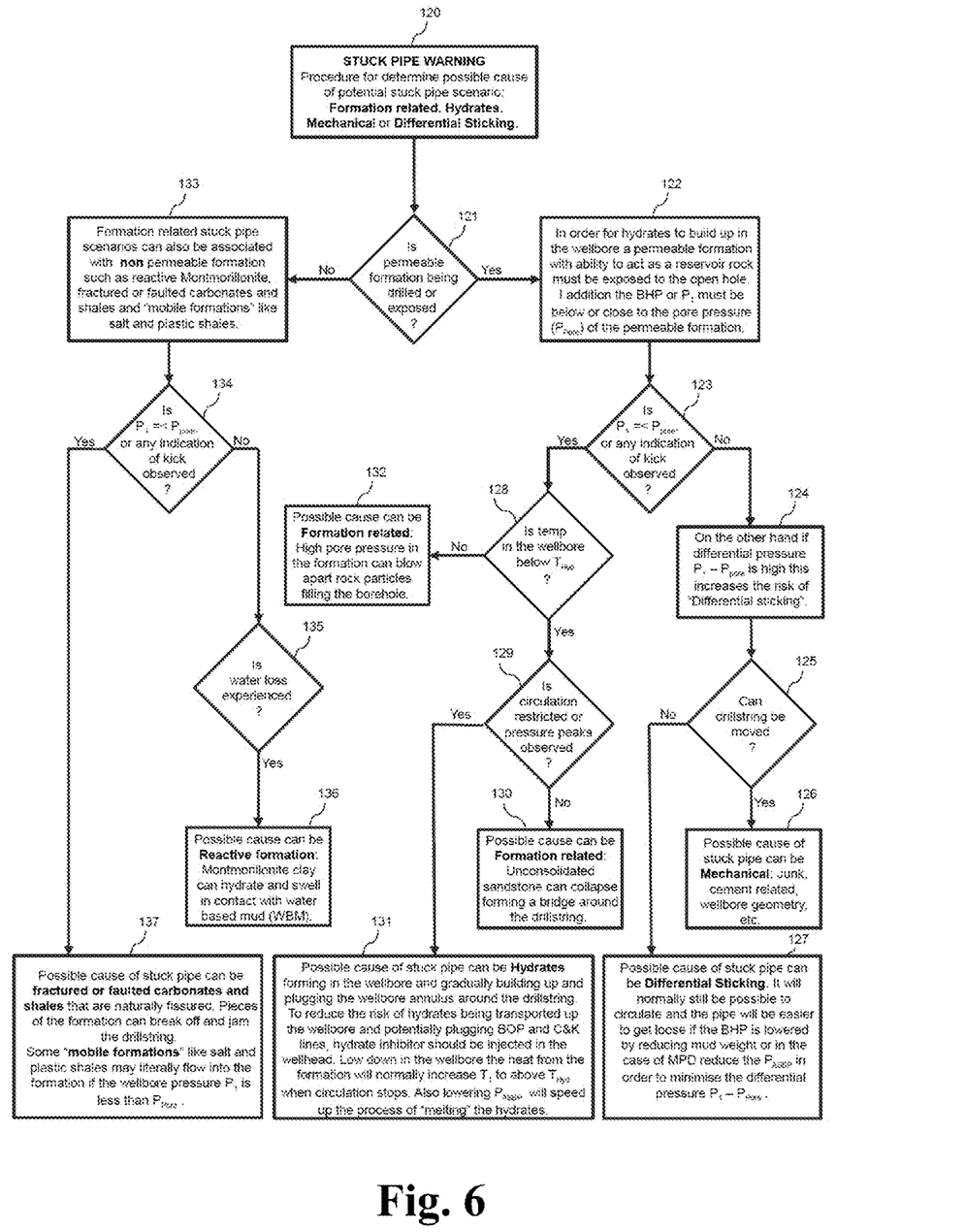
FIG. 6 discloses schematically a method for determining the correct remedial action to be taken based on stuck pipe warning.

In the FIGS. 4-6, it is made reference to the specific boxes in the decision trees, i.e., the text and required actions identified in these boxes shall be considered as a part of this written detailed description. FIGS. 4-6 are self-explanatory.

FIG. 4 shows schematically a method for determining the correct remedial action to be taken based on hydrate warning. In deep water it is not unusual to have low temperature below the hydrate formation temperature $T_{Hyd}$ in the wellhead, subsea BOP and lower part of the riser annulus (box 90). In these cases it is important that a dedicated chemical injection line or, if this is not available, the kill line can be used for injecting hydrate inhibitor (fluid), e.g., ethylene glycol (MEG). The amount of MEG required for hydrate suppression must be calculated based on mud type in use and ambient seawater temperature or worst case scenario for annulus mud temperature. It is important that the chemical injection line (or kill line) is filled up with MEG prior to drilling in formation that potentially can give gas influx (box 92), since hydrates may form quickly and potentially plug the subsea BOP and choke line when the kick is circulated out through the kill and choke (K&C) manifold. It should also be noted that under normal drilling operation the fluid in the kill and choke lines will normally be stagnant (continuous circulation not possible) and the temperature is therefore permanently below the hydrate formation temperature $T_{Hyd}$ in these lines (box 91). Hydrate inhibitor for hydrate suppression is therefore required in these kill and choke lines to reduce risk of plugging the lines when they are used for circulating out gas in a kick scenario.

After longer periods without circulation in the wellbore annulus, typically after a casing cement job and tripping operation, it is not unusual for the fluid temperature in the wellhead annulus to drop below the hydrate formation temperature $T_{Hyd}$. Prior to drilling ahead the driller shall perform the following actions; Start circulation and perform dynamic flow check (box 94), is dynamic flow check indicating gain OR loss?(box 95), if no; Continue to circulate until hydrate formation temperature in wellhead and marine drilling riser, is above hydrate formation temperature $T_{Hyd}$ (box 96). If the dynamic flow check (box 94) indicates gain OR loss (box 95), these signals must not be ignored. Hydrates may form when the gas mixes with the colder fluids in the upper part of the wellbore, so even if the flow check or shut-in pressure test (box 97), apparently shows normal values (box 98), it is important that circulation is continued (box 94), until temperature is above hydrate formation temperature $T_{Hyd}$ (box 96) and "bottoms-up" has been circulated out. Any abnormal pressure, increase or decrease after shut-in pressure test (box 98), is a strong indication that the well is taking a kick (box 99).

In the open wellbore deep down in the earth formation it is not usual to have low temperature below the hydrate formation temperature $T_{Hyd}$ (box 70), because of the general high formation temperature. However, since pressure also generally increase with depth, the hydrate formation temperature $T_{Hyd}$ can be above 30° C., so with high mud circulation the annulus fluid might not get time to heat up enough to get above these temperatures (box 71). To drill ahead with permanent temperature below the hydrate formation temperature $T_{Hyd}$ deep down in the well should be avoided (details in boxes 73, 75, 78, 77, 79, 82, 82 and 84).

Even more likely is it that the temperature deep down in the well drops below the hydrate formation temperature $T_{Hyd}$ due to cold fluid from the riser area after tripping, being pumped down or in the case of mud cap drilling where large amount of relative cold sacrificial fluids is pumped down both in the annulus and drill string in large quantities (box 72). These are more temporary events and prior to drilling ahead it is important that "bottoms up" operations while performing dynamic flow check is carried out, to check for any abnormalities (box 74).

FIG. 5 shows schematically a method for determine the correct remedial action to be taken after a kick is detected (box 100). If managed pressure drilling (MPD) or riser gas handling (RGH) equipment is installed (box 101), it is important that applied surface back pressure $P_{ASBP}$ to increase bottom hole pressure BHP and stop the influx is activated as quickly as possible (box 102). After the blow out preventer BOP is closed (box 103), it is important that hydrate inhibitor is injected immediately into the wellhead (box 106), if the temperature in wellbore, wellhead or riser is below the hydrate formation temperature $T_{Hyd}$ (box 104). There is also a special concern that hydrates may form. In such cases the actions identified in boxes 107, 108, 109 and 110 should be followed.

If the influx already has past the blow out preventer BOP (box 111), the riser gas needs to be handled depending on the available equipment topside (compare boxes 114, 115, 116 and 117). Even if there is no sign for gas in riser, special consideration should be taken if the annulus temperature in the riser is below the hydrate formation temperature $T_{Hyd}$ (see boxes 112 and 113 for details).

FIG. 6 discloses schematically a method for determining the correct remedial action to be taken based on stuck pipe warning. The novel part of this decision diagram is that it introduces hydrate plugging as a possible cause for stuck pipe (box 120). If permeable formation are being drilled or exposed (boxes 121 and 122), indication of a kick is observed (box 123), temperature in the wellbore is below the hydrate formation temperature $T_{Hyd}$ (box 128), circulation restricted or pressure peaks observed (box 129), then this is a strong indication that hydrates may are about to create a stuck pipe event (box 131).

Further measurements and/or steps regarding the stuck pipe warning are apparent from FIG. 6.

Figure 7:
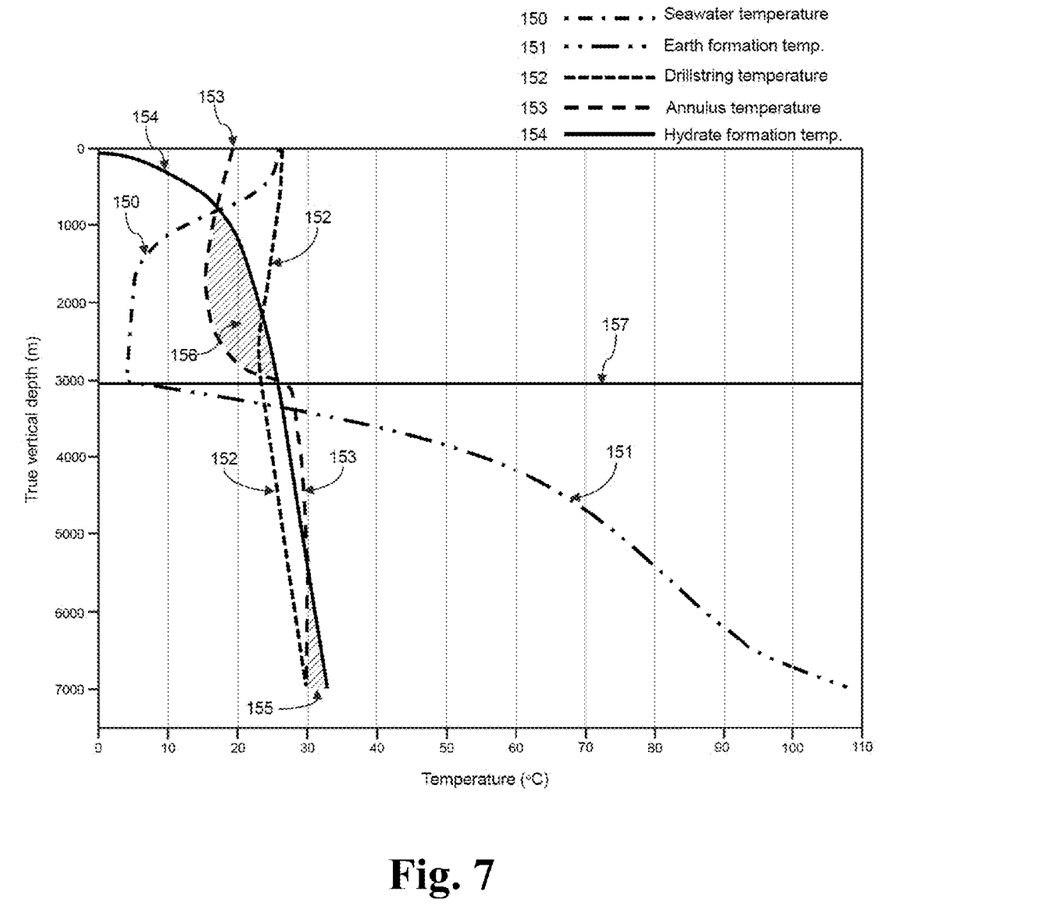
FIG. 7 discloses schematically an embodiment of the present invention.

FIG. 7 discloses schematically an embodiment of the present invention. The hydrate formation temperature $T_{Hyd}$ is plotted schematically relative to the true vertical depth (TVD). $T_{Hyd}$ is compared with the real measured (or calculated) temperature in the annulus 153. Risk of hydrate forming if hydrocarbon influx is present, can be seen as the shaded area 155 and 156. A typical embodiment of the present invention will be to show only the hydrate formation temperature $T_{Hyd}$ profile 154 and annulus temperature profile 153, together with the seabed and blow out preventer BOP location 157. The other curves are added only for information and understanding of the present invention. Seawater temperature profile 150, decreases quite rapidly, to typically around 5° C. at approximately 1500 meter water depth, and then slowly decreases to 3-4° C. at seabed 157. Earth formation temperature 151 increases rapidly with increasing depth. The drilling fluid being pumped down the drill string decreases slightly in temperature 152, as it is being cooled by the colder annulus fluid coming back to the rig in the riser. However below the seabed 157 the annulus fluid 153 is warmer than the drill string fluid 152, and the relative cold drill string fluid 152 prevent the annulus fluid for being heated any further although the surrounding earth formation temperature 151 is very hot. It should however be noted that this situation as shown in FIG. 7 is showing a situation with a large circulation rate. During periods with low or no circulation the annulus fluid 153 deep down in the wellbore will rabidly increase in temperature and the annulus fluid in the lower part of the riser 153, will decrease due to the colder seawater temperature 150.

The present invention has been described in non-limiting embodiments. It is clear that a person skilled in the art may make a number of alterations and modifications to the described embodiments without diverging from the scope of the present invention as defined in the attached claims.

What is claimed is:

1. A method for predicting a formation of hydrates in a wellbore or in a drilling riser annulus if a gas is present, the method comprising:
   pumping mud into the wellbore;
   logging actual mud properties;
   continuously measuring and/or calculating actual sets of pressure data and temperature data at given locations/intervals in the wellbore or in the drilling riser annulus;
   determining a theoretical temperature profile for the formation of hydrates dependent on mud properties and pressure as a function of a true vertical depth in a well;
   storing the theoretical temperature profile for the formation of hydrates in a control system;
   comparing the measured and/or calculated actual sets of pressure data and temperature data with the theoretical temperature profile for the formation of hydrates; and
   issuing a signal from a control system if the measured and/or calculated actual sets of pressure data and temperature data falls below or is lower than a predefined safety margin for the theoretical temperature profile for the formation of hydrates,
   wherein,
   the method is performed while drilling.

2. The method as recited in claim 1, wherein the continuously measuring and/or calculating the actual sets of pressure data and temperature data is preformed via at least one first pressure transmitter and at least one first temperature transmitter arranged in a first position in the well, and at least one second pressure transmitter.

3. The method as recited in claim 2, wherein the at least one first temperature transmitter and the at least one first pressure transmitter are arranged in an open hole section of the well.

4. The method as recited in claim 2, wherein the continuously measuring and/or calculating the actual sets of pressure data and temperature data is preformed via a plurality of pressure transmitters arranged in a fixed vertical distance in the well, and
   the method further comprises measuring and/or calculating a temperature at different locations in the well.

5. The method as recited in claim 1, further comprising:
   displacing a drilling riser if the temperature in the drilling riser is below the theoretical temperature profile for the formation of hydrates;
   pumping fresh mud down at least one booster line so as to circulate out gas cut mud;
   monitoring a possible rapid gas expansion as the hydrates melt at a low pressure; and
   preparing to divert overboard so as to avoid a drilling riser blow-out on a drill floor.

6. The method as recited in claim 1, further comprising, in case a wellbore influx has inadvertently passed a subsea blowout preventer:
   pumping mud down at least one booster line so as to circulate out gas cut mud;
   monitoring a possible rapid gas expansion; and
   preparing to divert overboard so as to avoid a drilling riser blow-out on a drill floor.

7. The method as recited in claim 1, further comprising:
   filling at least one kill line with a hydrate inhibitor fluid;
   injecting the hydrate inhibitor fluid present in the at least one kill line in a blow out preventer; and, simultaneously therewith,
   pumping mud down a drill string so as to circulate out wellbore fluids, to inhibitor up at least one choke line, and to divert to a mud gas separator.

8. The method as recited in claim 1, further comprising:
   determining whether a choke line shut-in pressure shows an abnormal pressure decrease; and, if an abnormal pressure decrease is determined,
   generating a wellbore influx and a hydrate alarm.

9. The method as recited in claim 1, further comprising:
observing an increased drag trend or torque oscillation during connections and/or an abnormal pressure increase or pressure oscillation during a circulation so as to identify a stuck pipe situation as a possible result of hydrate formation; and
confirming the fulfillment of each of the following conditions:
drilling in a permeable formation which has been identified to have an ability to act as a reservoir rock as well as having a pressure close to or higher than a bottom hole pressure or a measured pressure at a pressure transmitter in the well,
observing that the temperature in the wellbore is below a hydrate formation temperature, and
observing a circulation restriction or a pressure peak.

10. The method as recited in claim 9, wherein, in case of the stuck pipe situation caused by hydrate formation, the method further comprises:
injecting hydrate inhibitor fluid close to a wellhead,
stopping a circulation so as to allow a temperature in a formation to increase a temperature of fluids in the well so as to perform a hydrate dissociation process comprising melting or dissociating the hydrates into water and dense gas;
performing a flow check to verify that the hydrate dissociation process has started;
shutting-in the well if the well starts to flow; and
monitoring a shut-in pressure increase to determine a size of a hydrate plug/kick.

11. A method for predicting a formation of hydrates in a wellbore or in a riser annulus if a gas is present, the method comprising:
logging actual mud properties;
continuously measuring and/or calculating actual sets of pressure data and temperature data at given locations/intervals in the wellbore or in the riser annulus;
determining a theoretical temperature profile for the formation of hydrates dependent on mud properties and pressure as a function of a true vertical depth in a well;
storing the theoretical temperature profile for the formation of hydrates in a control system;
comparing the measured and/or calculated actual sets of pressure data and temperature data with the theoretical temperature profile for the formation of hydrates;
issuing a signal from a control system if the measured and/or calculated actual sets of pressure data and temperature data falls below or is lower than a predefined safety margin for the theoretical temperature profile for the formation of hydrates;
observing an increased drag trend or torque oscillation during connections and/or an abnormal pressure increase or pressure oscillation during a circulation so as to identify a stuck pipe situation as a possible result of hydrate formation; and
confirming the fulfillment of each of the following conditions:
drilling in a permeable formation which has been identified to have an ability to act as a reservoir rock as well as having a pressure close to or higher than a bottom hole pressure or a measured pressure at a pressure transmitter in the well,
observing that the temperature in the wellbore is below a hydrate formation temperature, and
observing a circulation restriction or a pressure peak.

12. The method as recited in claim 11, wherein, in case of the stuck pipe situation caused by hydrate formation, the method further comprises:
injecting hydrate inhibitor fluid close to a wellhead,
stopping a circulation so as to allow a temperature in a formation to increase a temperature of fluids in the well so as to perform a hydrate dissociation process comprising melting or dissociating the hydrates into water and dense gas;
performing a flow check to verify that the hydrate dissociation process has started;
shutting-in the well if the well starts to flow; and
monitoring a shut-in pressure increase to determine a size of a hydrate plug/kick.

* * * * *